(12) United States Patent
Pereira et al.

(10) Patent No.: US 9,146,664 B2
(45) Date of Patent: Sep. 29, 2015

(54) PROVIDING CONTENT ROTATION DURING SCROLL ACTION

(71) Applicant: Microsoft Corporation, Redmond, WA (US)

(72) Inventors: Jorge Pereira, Seattle, WA (US); Eric Brumer, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 235 days.

(21) Appl. No.: 13/859,484

(22) Filed: Apr. 9, 2013

(65) Prior Publication Data

US 2014/0304644 A1 Oct. 9, 2014

(51) Int. Cl.
*G06F 3/0485* (2013.01)
*G06F 3/0482* (2013.01)
*G06F 3/0483* (2013.01)

(52) U.S. Cl.
CPC ............ *G06F 3/0485* (2013.01); *G06F 3/0482* (2013.01); *G06F 3/0483* (2013.01)

(58) Field of Classification Search
CPC ........................... G06F 3/04855; G06F 4/0485
USPC ...................................................... 715/784
See application file for complete search history.

(56) References Cited

U.S. PATENT DOCUMENTS

| | | |
|---|---|---|
| 2002/0015024 A1 | 2/2002 | Westerman et al. |
| 2003/0142136 A1 | 7/2003 | Carter et al. |
| 2005/0091596 A1 | 4/2005 | Anthony et al. |
| 2006/0250358 A1 | 11/2006 | Wroblewski |
| 2008/0168384 A1 | 7/2008 | Platzer et al. |
| 2008/0168404 A1 | 7/2008 | Ording |
| 2008/0252661 A1 | 10/2008 | Hilton |
| 2009/0019401 A1 | 1/2009 | Park et al. |
| 2011/0193881 A1 | 8/2011 | Rydenhag |
| 2011/0261051 A1 | 10/2011 | Meyer et al. |
| 2013/0038634 A1 | 2/2013 | Yamada et al. |

OTHER PUBLICATIONS

Risden, et al., "An Initial Examination of Ease of Use for 2d and 3d information Visualizations of Web Content", Retrieved at <<http://research.microsoft.com/pubs/101784/IJHCS004.pdf>>, In International Journal of Human-Computer Studies—Empirical evaluation of information visualizations. vol. 53, Issue 5, Nov. 2000, pp. 25.
"Project Austin", Retrieved at <<http://austin.codeplex.com/>>, Retrieved Date: Feb. 19, 2013, pp. 3.
"International Search Report & Written Opinion for PCT Patent Application No. PCT/US2014/033118", Mailed Date: Aug. 1, 2014, Filed Date: Apr. 7, 2014, 14 Pages.

*Primary Examiner* — Andrea Leggett
(74) *Attorney, Agent, or Firm* — Tom Wong; Jim Ross; Micky Minhas

(57) ABSTRACT

A display application rotates content to provide a perspective view along the z-axis during a scroll action as a feedback to a user indicating a scroll action has reached a beginning or an end of available content. Determined direction and speed and/or acceleration of the scroll action is applied to move content and rotate it based on: a tilt angle proportional to the speed and/or acceleration and a rotation axis perpendicular to the direction. Additional content is displayed in the perspective view based on the tilt angle. And, the tilt angle is adjusted to rotate the content in response to reaching an end of the content during the scroll action or upon detecting a subsequent scroll action.

20 Claims, 8 Drawing Sheets

PROVIDING CONTENT ROTATION DURING SCROLL ACTION

BACKGROUND

Mobile computing has transformed media consumption across markets. Miniaturization across product generations has enabled more functionality to be accomplished by smaller devices. A modern smartphone has more computing capacity than a desktop computer a few years ago. Mature product processes have also enabled advances in technology to be integrated to automated production of mobile devices seamlessly. Extensive automation has led to inexpensive components. Inexpensive components have enabled manufacturing of inexpensive mobile devices providing functionality on the go.

Screen real estate is a substantial factor in content presentation within mobile computing. Minimal screen size in mobile devices may limit content presentation and force partitioning and formatting of content to suit the physical limitations. Dynamic orientation changes also force content providers to consider presentation formatting to suit device orientation. Formatting in landscape and portrait modes become crucial for content consumption through mobile devices in order to accommodate users constantly shifting their content consumption habits.

In legacy solutions, content applications provide scroll bars for users to bring to view content that does not fit on a screen. In mobile solutions, scroll bars utilize limited screen real estate. Additionally, content displayed on a screen is presented in a constant size during a scroll action in legacy implementations. Present solutions also are limited in responding to reaching an end of the content during a scroll action. Some solutions simply stop moving the content in response to reaching an end. Others use a spring effect to notify the user that no additional content exists. No present solution adequately solves issues of presenting richer content during scrolling or proper notification about reaching an end of the content.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing content rotation during a scroll action as a feedback to a user indicating a scroll action has reached a beginning or an end of available content. According to some embodiments, a display application displaying content may detect a scroll action from a captured gesture. A gesture may include a variety of user actions to indicate a scroll movement to the application. The application may determine a direction and speed and/or acceleration of the scroll action and move the content in the determined direction based on the detected speed and/or acceleration.

The content may be rotated on at least one axis perpendicular to the direction based on a tilt angle in proportion to the speed and/or acceleration of the scroll action. The rotation may display the content in a three dimensional (3D) perspective view where a displayed edge of the content is tilted compared to the opposite displayed edge. The tilt angle may be set in proportion to the speed and/or acceleration of the scroll motion. An increase in speed and/or acceleration of the scroll action may increase the tilt angle. Rotation of the content may also bring into view additional parts of the content.

In addition, the tilt angle may be adjusted in relation to the speed and/or acceleration of the scroll action or a subsequent scroll action when an end of the content is reached.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
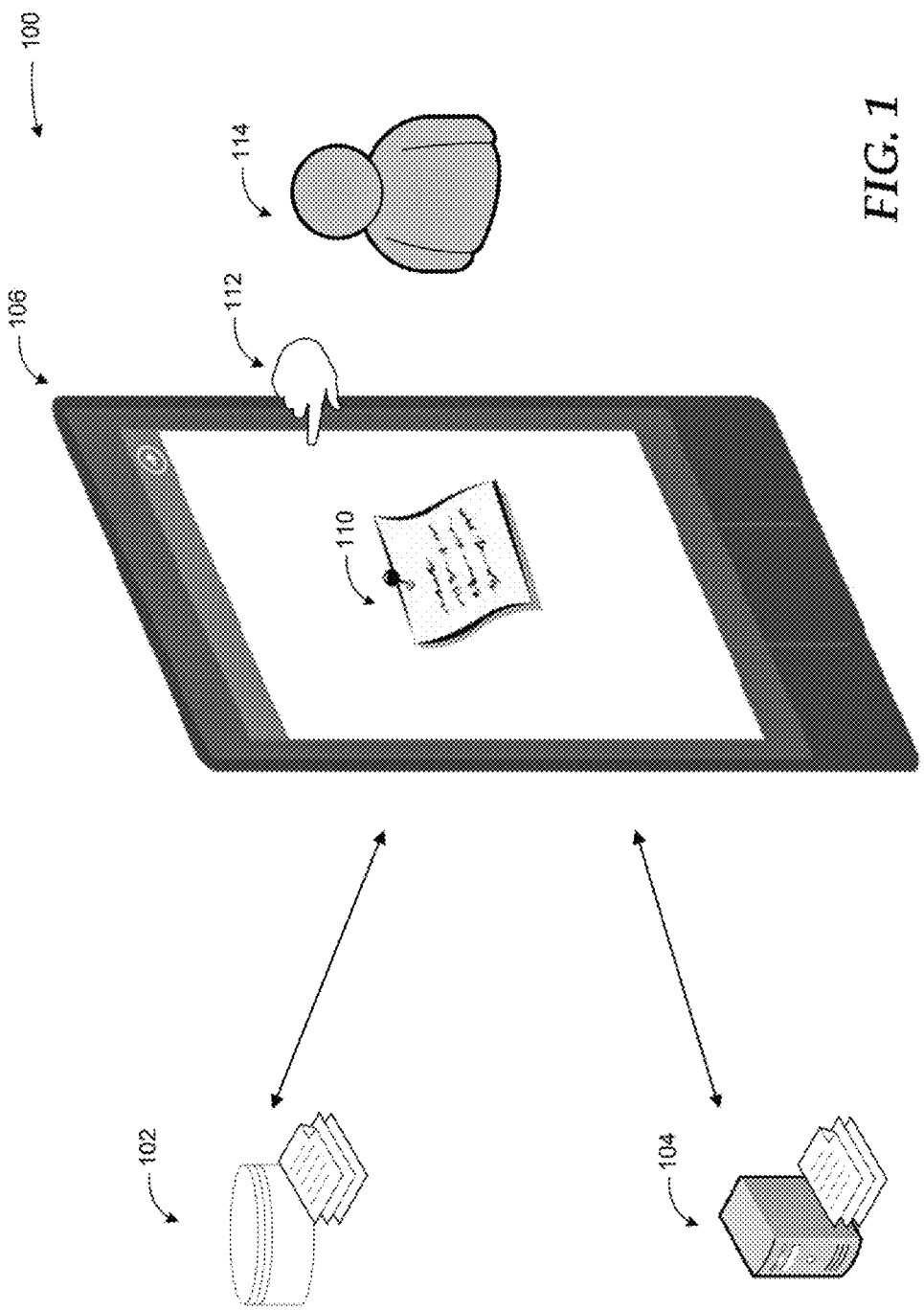
FIG. 1 illustrates an example concept diagram of providing content rotation during a scroll action according to some embodiments.

As briefly described above, content may be rotated during a scroll action. A display application may determine direction and speed of a scroll action detected on a displayed content. The content may be moved based on the detected speed while rotating the content on a rotation axis perpendicular to the direction based on a tilt angle determined in proportion to the detected speed. The tilt angle may be adjusted in proportion to the speed of the scroll action upon reaching an end of the content.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing content rotation during a scroll action. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example concept diagram of providing content rotation during a scroll action according to some embodiments. The components and environments shown in diagram 100 are for illustration purposes. Embodiments may be implemented in various local, networked, cloud-based and similar computing environments employing a variety of computing devices and systems, hardware and software.

A device 106 may display content 110 to a user 114. Device 106 is not limited to example smart phone, however device may also include other mobile and non-mobile devices capable of detecting gestures. The user 114 may interact with the content through a gesture 112. The device 106 may detect a variety of gestures from user inputs including keyboard, mouse, pen, voice, touch, visual, etc. The device may rotate the content 110 corresponding to a scroll action detected from the captured gesture. The user 114 may use a swipe action, a voice command, a visual cue such as an eye movement to provide the scroll action. The device 106 may utilize a touch screen, a camera, or a microphone to capture the gesture used to provide the scroll action.

The device 106 may load the content 110 from local storage. The content 110 may be any type of media including text, graphic, audio, video, or combinations. Alternatively, the content 110 may be retrieved from a data source such as a data store 102 or from a media server 104. The data store 102 and media server 104 may be available through a local network accessible by the device 106. Alternatively, the data store 102 and media server 104 may make content 110 available through remote services such as a cloud hosted content service.

Embodiments are not limited to implementation in a device 106 such as a smart phone. A display application according to embodiments may provide content rotation during a scroll action in other platforms. A user may experience content rotation during a scroll action in any device capable of displaying the content. In addition to a touch-enabled device, content rotation during scrolling may be accomplished through other input mechanisms such as optical gesture capture, a gyroscopic input device, a mouse, a keyboard, an eye-tracking input, and comparable software and/or hardware based technologies. For the purposes of the embodiments, Cartesian coordinate system defines x-axis as all points between 90 and 270 degrees and y axis as all points between 0 and 180 degrees. Z-axis is the third dimension tangential to the x and y-axis.

Figure 2:
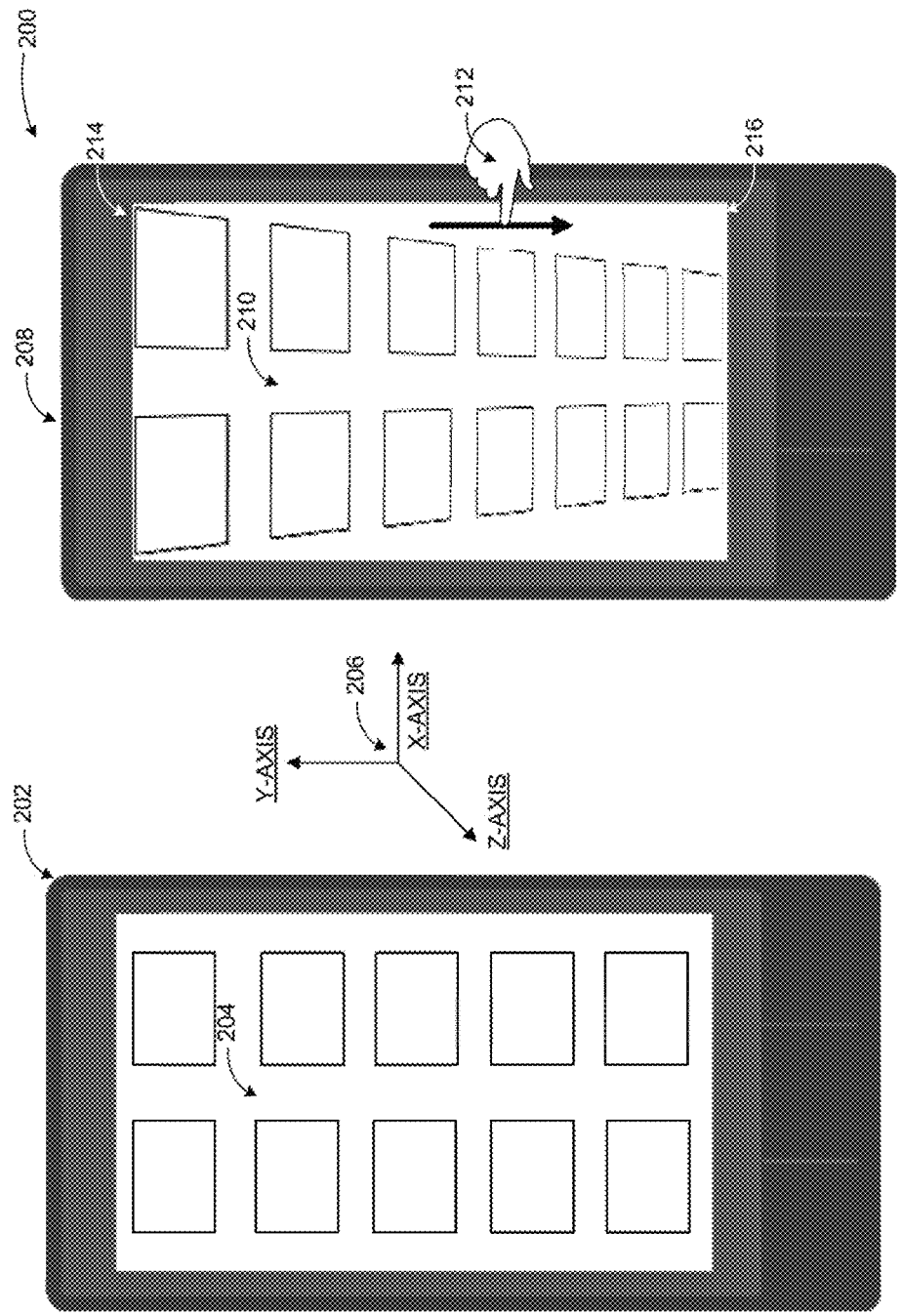
FIG. 2 illustrates an example of content rotation in response to a scroll action according to embodiments.

FIG. 2 illustrates an example of content rotation in response to a scroll action according to embodiments. Diagram 200 displays a display application of a device (such as a smartphone) rotating content in response to a detected scroll action based on the direction and speed of the scroll action.

The device 202 may display content 204 on its display surface. The display surface may be touch enabled to capture gestures used to interact with the content. Alternatively, a gesture to interact with the content 204 may be captured through other hardware of the device 202 such as a camera or a microphone. In addition, the content 204 may be partitioned to parts such as text, image, etc. The content may also be sized and formatted to suit a particular purpose such as presentation in a mobile setting where screen space may be limited.

In legacy solutions, when a screen size is insufficient to display entire content, a display application provided scroll features such as scroll bars to move through the content. Unlike legacy solutions, embodiments rotate the content during a scroll action. The content may be rotated in a rotation axis which may include the x or y axis 206. Rotating the content may be initiated by the device 208 detecting a scroll action 212 in a captured gesture. The captured gesture may be a swipe action determined to be the scroll action 212 along y-axis. The direction of the scroll action may determine the rotation axis, as the application may rotate the content on a perpendicular axis in relation to the direction of the scroll.

As stated previously, the direction of the scroll action may determine the rotation axis. The application may interpret the direction of the scroll action to align with x or y axis. In an example scenario, the application may interpret a scroll action having an angle other than 0, 90, 180, or 270 degrees to move in only x or y axis in relation to the device 208. The rotation axis may be selected based on proximity of the direction of the scroll action to the x and y-axis. If the direction of the scroll action 212 is less than a 45 degree angle from the x-axis then the scroll action may be interpreted to move along the x-axis. If the direction of the scroll action is less than a 45 degree angle from the y-axis then the scroll action may be interpreted to move along the y-axis. If the direction of the scroll action is exactly at 45 degree angle from either x or y-axis in relation to the device 208 then the direction may be determined based on a system setting or a user preference. The system setting may include the orientation of the content in relation to the display surface of the device 208. In addition, the application may select the x-axis as the rotation axis if the direction is determined to have an angle of 0 or 180 degrees. Alternatively, the application may select the y-axis as the rotation axis if the direction is determined to have an angle of 90 or 270 degrees. The angle of the direction may be determined based on an average of a predetermined number of sampled direction angles measured during the length of the scroll action for a non-linear scroll action.

Subsequent to determining a direction of the scroll action 212, the content 210 may be rotated on a rotation axis perpendicular to the direction. The application may select a rotation point on a top edge 214 of a display surface of the device 208 opposite from an edge on a path of the scroll action. Alternatively, the rotation point may be a content entry location on to the display surface. Yet, in other examples, the rotation point may be determined by a predetermined system setting or may be a user configurable setting at any location on the display surface of a device. In an example scenario, the predetermined system setting may define the rotation point as a middle location of the display surface. In such a scenario, the application may rotate the content based on a middle location of the display surface on a rotation axis determined based on the direction of the scroll action.

The application may display additional content while rotating the content during a scroll action 212. The application may provide a perspective view of the content 210 along the z-axis. The application may fit additional parts of the content 210 into the perspective view compared to a planar view. A user desiring to view additional content may provide a scroll action to the device 208 and preview additional content compared to a planar view of the content.

Figure 3:
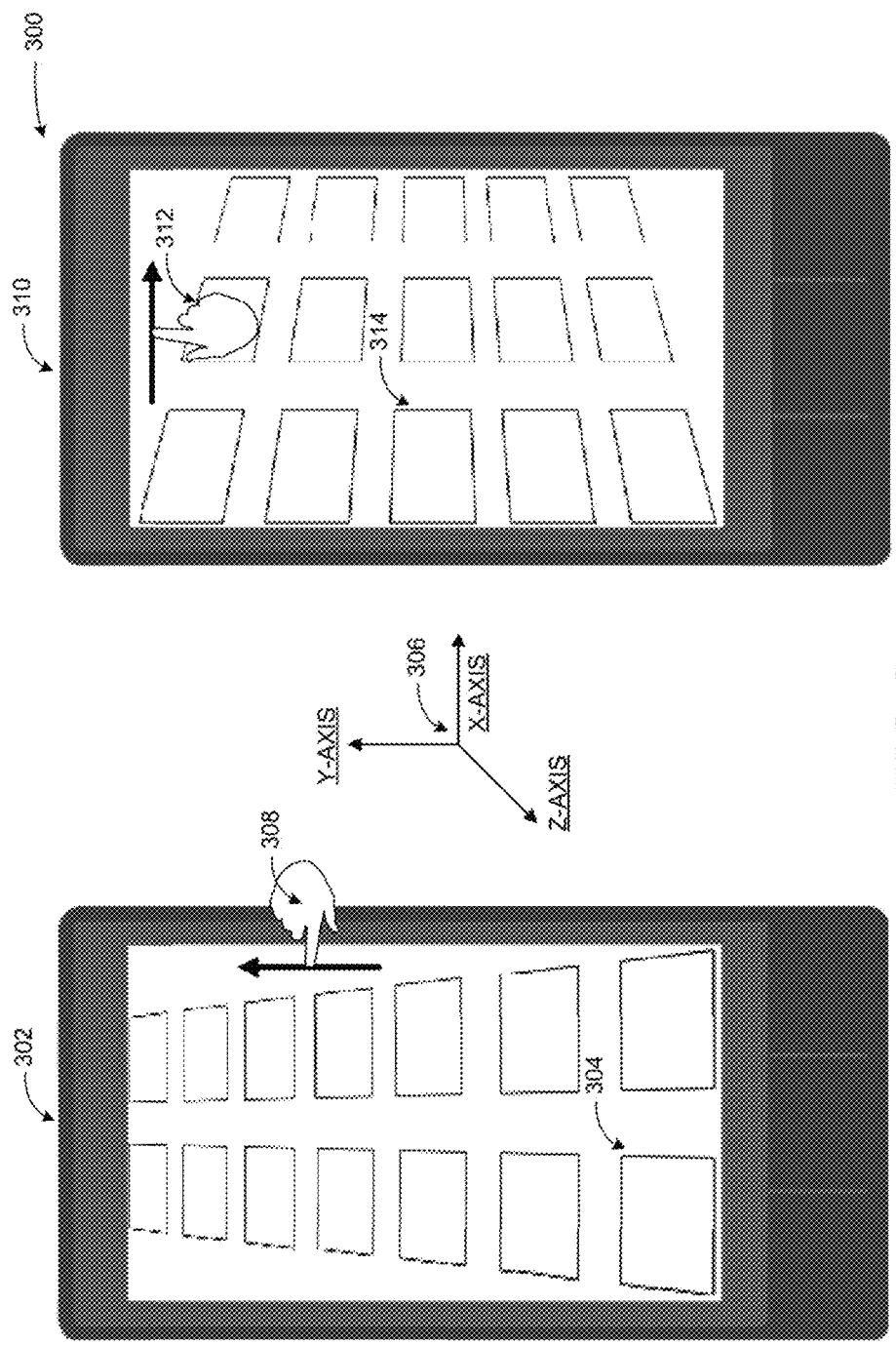
FIG. 3 illustrates other content rotation examples in response to scroll actions in other directions according to embodiments.

FIG. 3 illustrates other content rotation examples in response to scroll actions in other directions according to embodiments. Diagram 300 displays rotation of content in response to a scroll action 308 towards a top edge of device 302 and another rotation of content in response to another scroll action 312 towards a side edge of the device 310.

Display applications executed in devices 302 and 310 may rotate contents 304 and 314 respectively. Content on a device may be rotated in a rotation axis which may include x, and y axis 306 perpendicular to a determined direction of the scroll action. The direction of the scroll action may be interpreted to move in only x or y axis. The direction of the scroll action may be determined based on a scheme as described above in association with FIG. 2. In addition, contents 304 and 314 may be composed of multiple parts such as text, images, etc. The displayed content may be formatted based on a device orientation as described above.

Device 302 may detect a scroll action 308 in a direction on the y-axis towards a top edge of the device's display surface. In response to the scroll action 308, the display application may rotate the content 304 on the x-axis perpendicular to the direction of the scroll action 308. The rotation point may be a bottom edge of the display surface of the device 302 opposite from an edge on a path of the scroll action.

Alternatively, device 310 may detect a scroll action 312 in a direction on the x-axis towards a right edge of the device's display surface. In response to the scroll action 312, the display application may rotate the content 314 on the y-axis perpendicular to the direction of the scroll action 312. The rotation point may be a left edge of the display surface of the device 310 opposite from an edge on a path of the scroll action. Yet, in another example scenario, the content may be rotated on the y-axis on a rotation point on the right edge of the display surface in response to a scroll action towards left edge of the display surface.

Embodiments, are not limited to detecting scroll actions on only x or y axis and rotating the content in a perpendicular axis to the direction of the scroll action. The content may be rotated in any rotation point on the display surface of the device. In addition, the content may be rotated in a skewed rotation to correspond to an angle other than 0, 90, 180, or 270 degrees of the direction of the scroll action.

Figure 4:
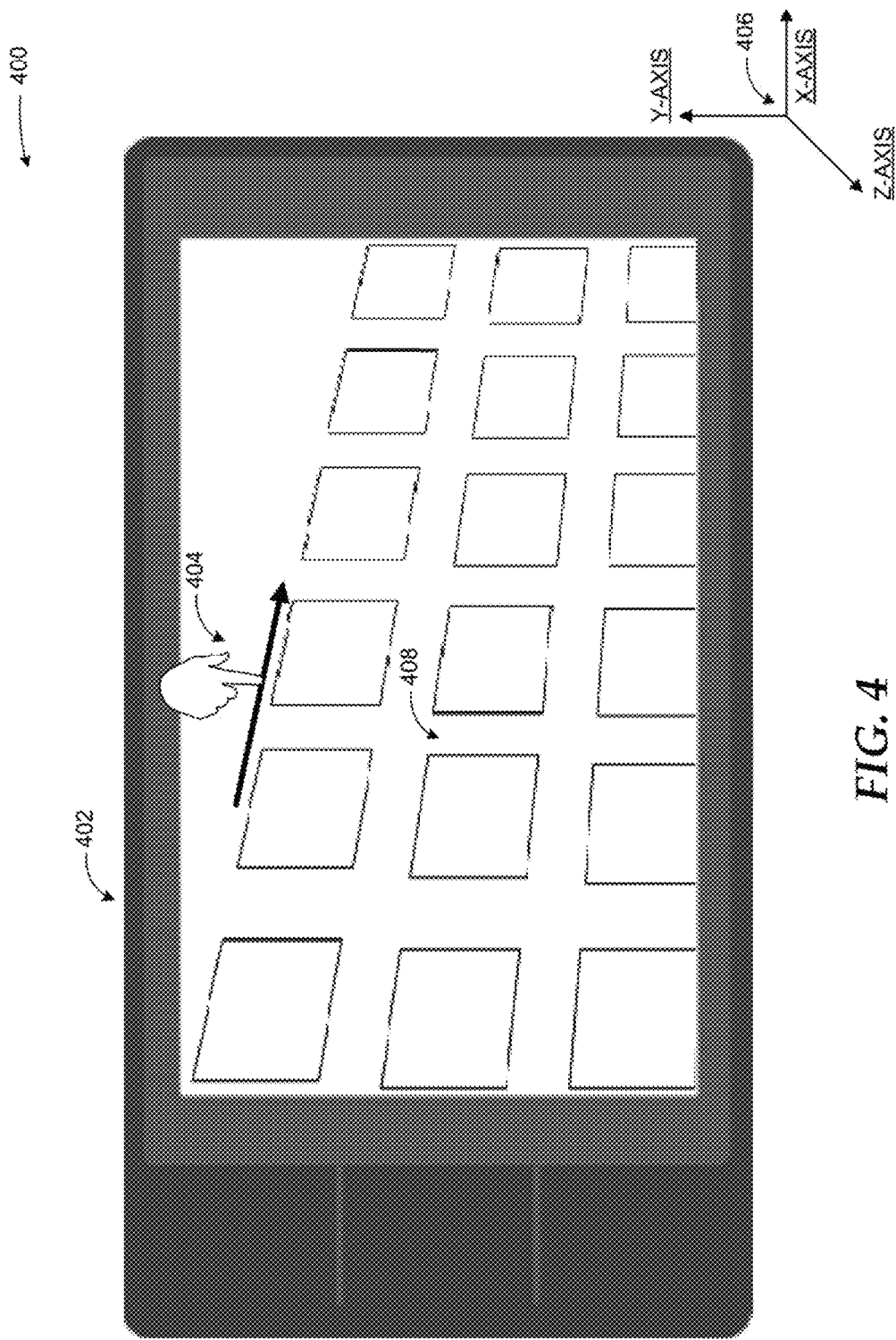
FIG. 4 illustrates an example of a skewed rotation in response to a scroll action having a direction in an angle other than 0, 90, 180, or 270 degrees according to embodiments.

FIG. 4 illustrates an example of a skewed rotation in response to a scroll action having a direction in an angle other than 0, 90, 180, or 270 degrees according to embodiments.

Diagram 400 displays a device 402 executing a display application rotating the content 408.

The device 402 may display content 408 based on device or application settings as described above. The display application, according to embodiments, may detect a scroll action 404. Unlike above embodiments, the display application may not limit interpretation of a direction of the scroll action to only a movement on x or y axis 406. The application may interpret the scroll action 404 to move along both x and y-axis and rotate the content 408 accordingly.

The device 402 may rotate the content 408 in relation to a scroll action 404 having vertical and horizontal components. The rotation axis may be determined to be perpendicular to the scroll action and the rotation axis may be at a degree in between x and y-axis. The rotation point may be an edge away from the path of the direction of the scroll action 404. The edge used as the rotation point may be determined as the edge perpendicular to either x or y axis which is less than a 45 degree angle to the direction of the scroll action 404. The application may select an edge used as a rotation point for a scroll action having a direction in a 45 degree angle from x or y axis based on a predetermined system setting or a user configurable setting.

The display application may provide a skewed perspective view of the content 408 along x and y-axis as a result of the skewed rotation. The skewed perspective view may display additional content along x or y axis while rotating the content.

Figure 5:
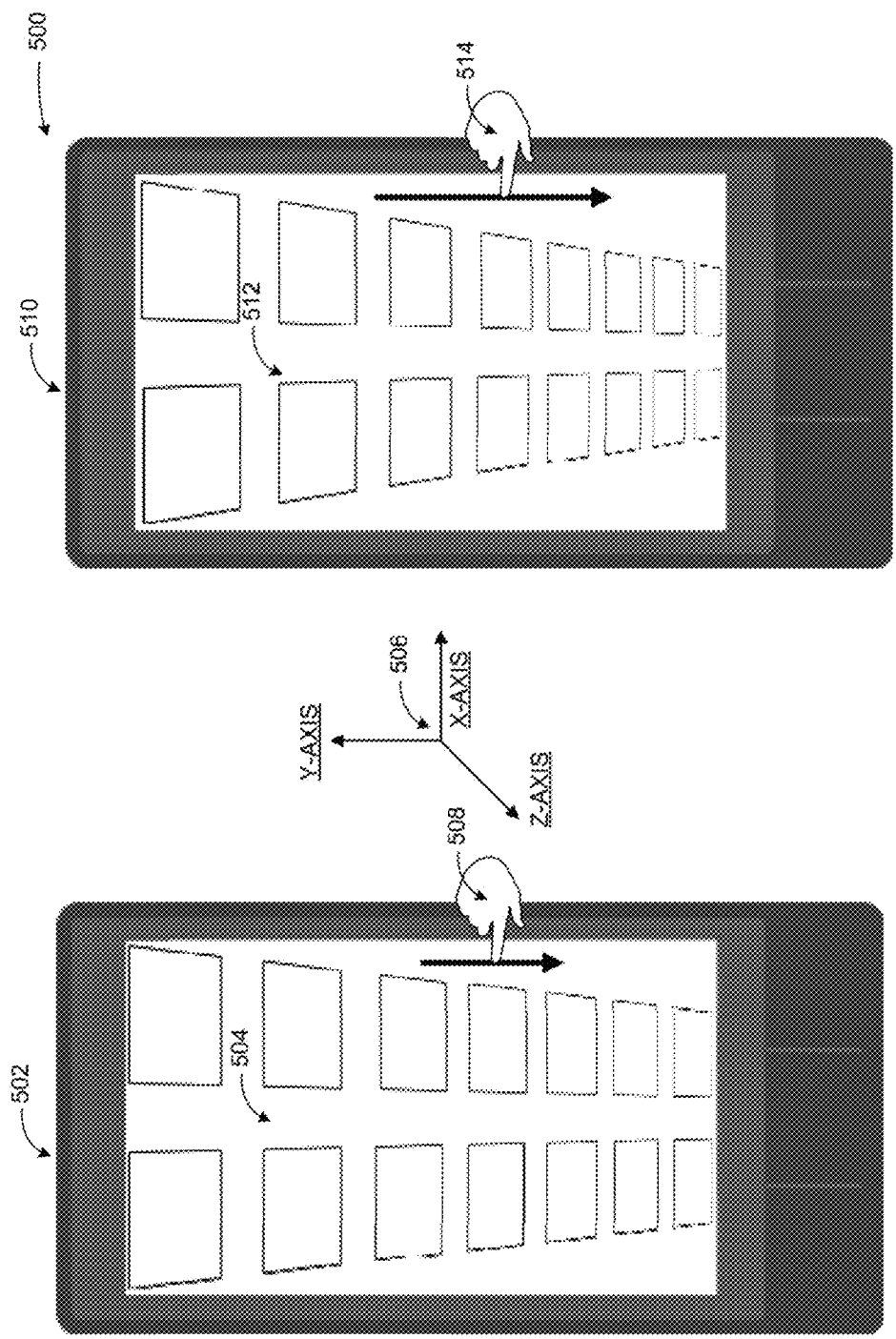
FIG. 5 illustrates examples of adjusting a tilt angle in proportion to the speed of scroll actions according to embodiments.

FIG. 5 illustrates examples of adjusting a tilt angle in proportion to the speed of the scroll actions according to embodiments. Diagram 500 illustrates two examples adjusting a tilt angle of the content in proportion to the detected speed of a scroll action.

Device 502 may detect a speed of scroll action 508 for rotating the content 504 on x and/or y axis to display a perspective view along the z-axis 506. A display application of device 502 may determine a tilt angle for rotating the content 504 in proportion to the detected speed of the scroll action 508. The proportion between the tilt angle and the detected speed of the scroll action 508 may be determined based on a predetermined system setting or a user configurable setting. The proportion also determines a depth of the perspective view while rotating the content 504. The display application increases additional content in the perspective view in response to an increase in the proportion. The display application decreases additional content in the perspective view in response to a decrease in the proportion. The tilt angle may gradually be adjusted to 0 degree if the device 502 does not detect a subsequent a scroll action or if the display application reaches an end of the content.

Similarly, device 510 detects a scroll action 514 with an increased speed compared to the scroll action 508 on device 502. In response to the increased speed of the scroll action 514, the display application of device 510 may adjust the tilt angle to an increased value for rotating the content 512. The display application of device 510 may display additional content in proportion to the increased value of the tilt angle. As such, the display application may rotate the content 512 displaying additional content in proportion to the tilt angle which is in proportion to the detected speed of the scroll action 514. If the application does not detect a subsequent scroll action or if it reaches an end of the content, the tilt angle may gradually be adjusted to 0 degrees.

In other embodiments, in response to detecting a subsequent scroll action while displaying an end of the content, the display application may only adjust the tilt angle to rotate the content. If the direction of the subsequent scroll action is away from the end of the content than the display application may adjust the tilt angle in proportion to the speed and/or acceleration of the subsequent scroll action.

In yet other embodiments, a device capable of detecting a scroll action from a captured gesture may be enabled to track a user's eye movement. The device may interpret the user's eye movement as a scroll action. In an example scenario, the device may interpret a user's eye movement towards an edge of the device's display surface as a scroll action in a direction toward the edge. In such a scenario, the display application may rotate the content based on a predetermined tilt angle and move the content in the direction of the scroll action based on a predetermined speed and/or acceleration. The application may also measure the speed and/or acceleration of the eye rotation and adjust the tilt angle of the content and the speed and/or acceleration of the scroll action in proportion to the speed and/or acceleration of the eye rotation.

The example scenarios and schemas in FIG. 2 through 5 are shown with specific components, data types, and configurations. Embodiments are not limited to systems according to these example configurations. Providing content rotation during a scroll action may be implemented in configurations employing fewer or additional components in applications and user interfaces. Furthermore, the example schema and components shown in FIG. 2 through 5 and their subcomponents may be implemented in a similar manner with other values using the principles described herein.

Figure 6:
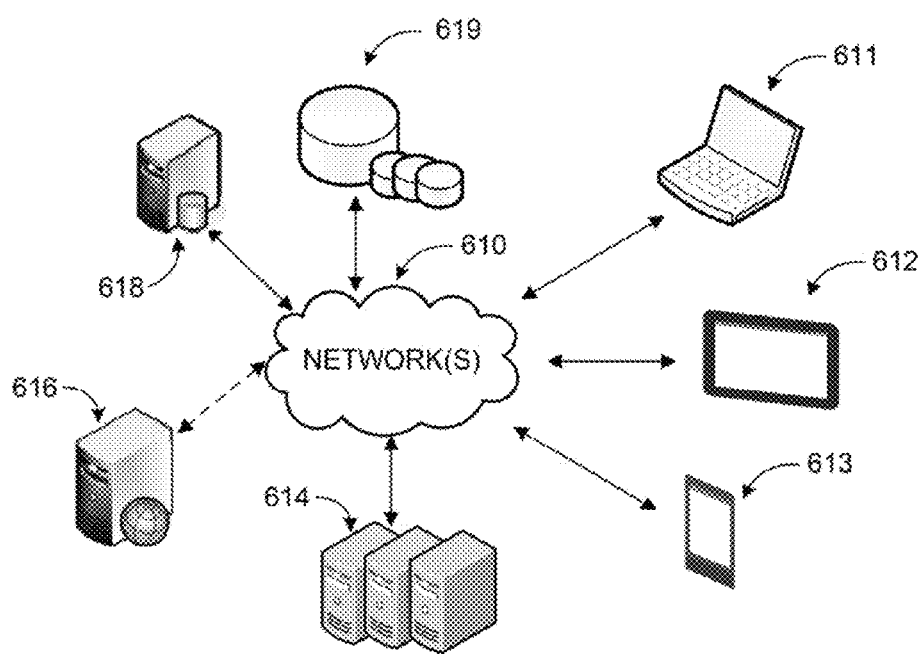
FIG. 6 is a networked environment, where a system according to embodiments may be implemented.

FIG. 6 is a networked environment, where a system according to embodiments may be implemented. Local and remote resources may be provided by one or more servers 614 or a single server (e.g. web server) 616 such as a hosted service. An application may execute on individual computing devices such as a smart phone 613, a tablet device 612, or a laptop computer 611 ('client devices') and communicate with a content resource through network(s) 610.

As discussed above, a display application may provide content rotation during a scroll action. The display application may rotate content in a rotation axis perpendicular to a detected direction of a scroll action. The rotation may be adjusted based on a tilt angle in proportion to a detected speed and/or acceleration of the scroll action. Client devices 611-613 may enable access to applications executed on remote server(s) (e.g. one of servers 614) as discussed previously. The server(s) may retrieve or store relevant data from/to data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to provide content rotation during a scroll action. Furthermore, the networked environments discussed in FIG. 6 are for illustration purposes only. Embodiments are not limited to the example applications, modules, or processes.

Figure 7:
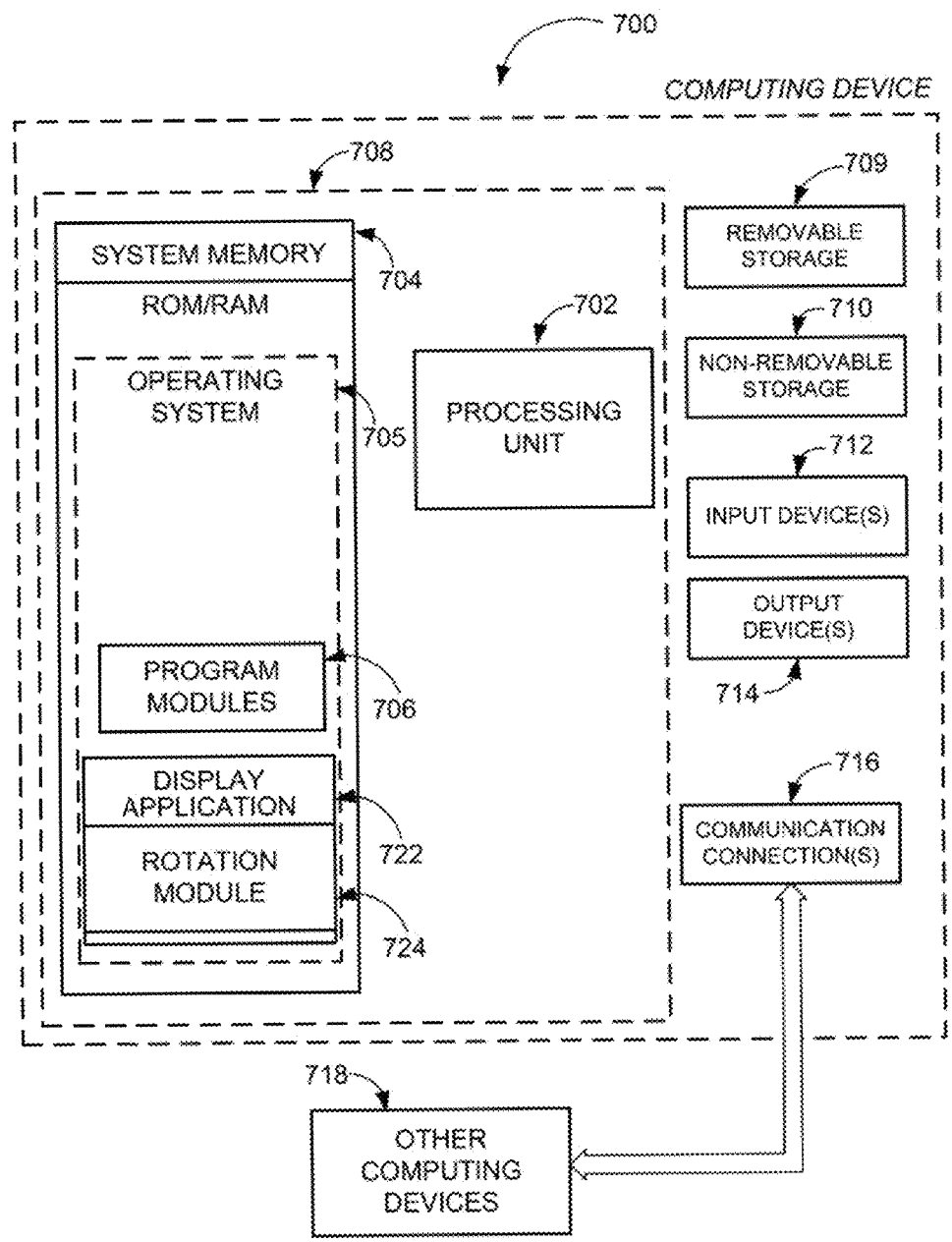
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® and WINDOWS PHONE® operating systems from MICROSOFT CORPORATION of Redmond, Wash. The system memory 704 may also include one or more software applications such as program modules 706, a display application 722, and a rotation module 724.

A display application 722 may detect a scroll action on displayed content. The display application 722 may determine a direction and a speed and/or acceleration of the scroll action. The rotation module 724 may rotate the displayed content based on a tilt angle in proportion to the determined speed and/or acceleration and on an axis perpendicular to the direction of the scroll action. A perspective view along z-axis of the content may be displayed as the content is moved by the application 722 in response to the scroll action. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. Computer readable storage media is a computer readable memory device. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wireless network in a distributed computing environment, a satellite link, a cellular link, and comparable mechanisms. Other devices 718 may include computer device(s) that execute communication applications, storage servers, and comparable devices. Communication connection(s) 716 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 8:
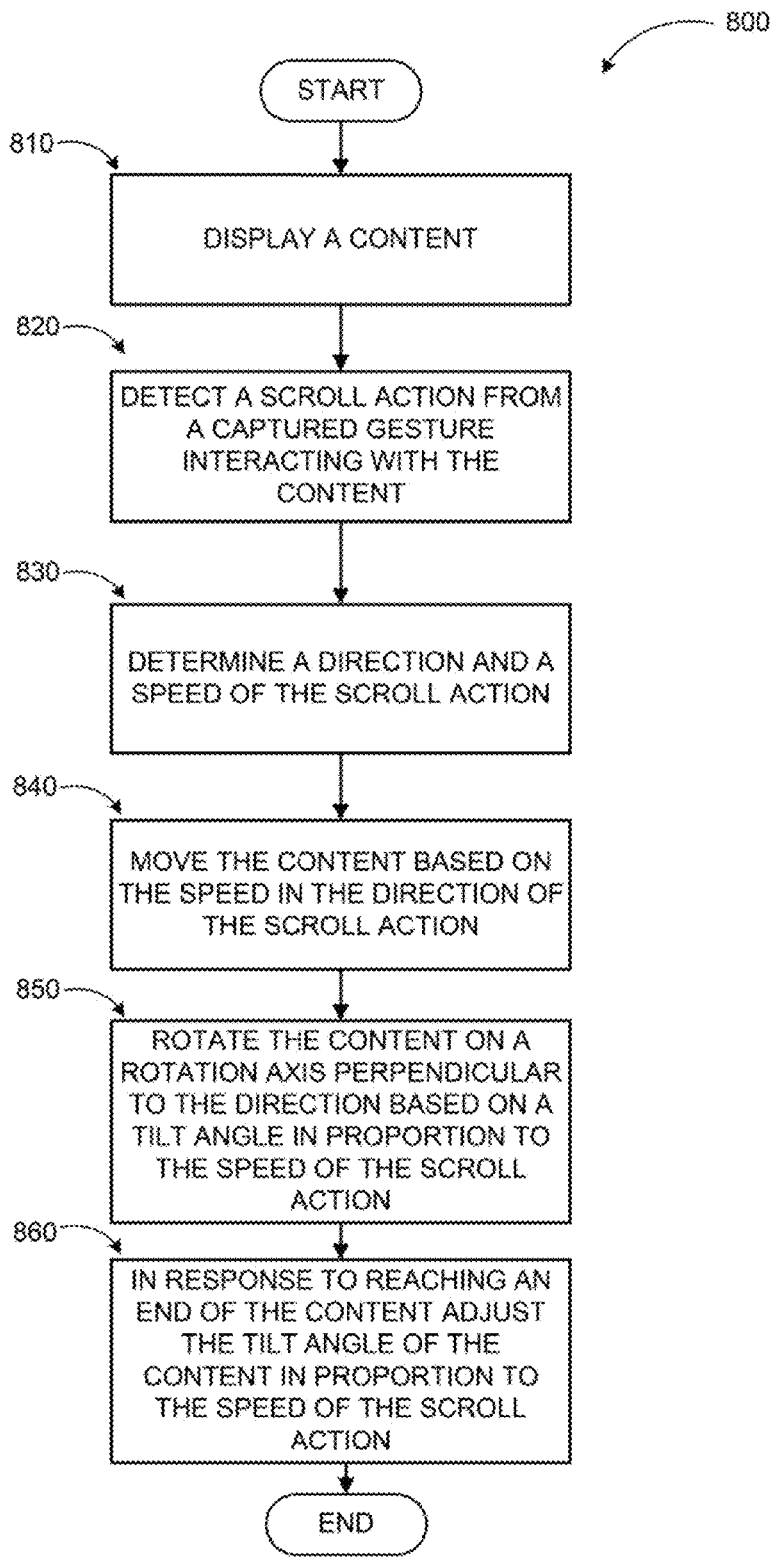
FIG. 8 illustrates a logic flow diagram for a process providing content rotation during a scroll action according to embodiments.

FIG. 8 illustrates a logic flow diagram for a process providing content rotation during a scroll action according to embodiments. Process 800 may be implemented by a display application in some examples.

Process 800 may begin with operation 810 where the display application may display content. The content may be composed of one or more parts formatted based on system or user settings. At operation 820, a scroll action may be detected from a captured gesture interacting with the content. The gesture may include various input forms including touch, visual, audio, keyboard, mouse, pen, and combinations. Next, the application may determine a direction and a speed and/or acceleration of the scroll action at operation 830. The direction determination may be based on an average of sampled direction measurements during the scroll action measured based on a sample frequency. The speed and/or acceleration determination may be based on averaging sampled speed and/or acceleration measurements during the scroll action measured based on a sample frequency. Sampling frequency may be retrieved from a predetermined system setting or a user adjustable value.

The application may move the content based on the speed and/or acceleration in the direction of the scroll action at operation 840. While moving the content, the application may rotate the content on a rotation axis perpendicular to the direction based on a tilt angle in proportion to the speed and/or acceleration of the scroll action at operation 850. The proportion may be user adjustable to control additional content displayed by the perspective view during the scroll action. In response to reaching an end of the content, the application may adjust the tilt angle of the content in proportion to the speed and/or acceleration of the scroll action or the speed and/or acceleration of a subsequent scroll action at operation 860. The tilt angle may be adjusted gradually to 0 degrees if another scroll action is not detected.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 800 are for illustration purposes. Providing content rotation during a scroll action, according to embodiments, may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for providing a rotation of a content during a scroll action, the method comprising:
displaying the content;
detecting the scroll action from a captured gesture interacting with the content;
determining a direction and one of a speed and an acceleration of the scroll action;
moving the content based on the speed in the direction of the scroll action;
rotating the content on a rotation axis perpendicular to the direction based on a tilt angle in proportion to the speed of the scroll action, wherein the proportion between the tilt angle and the speed of the scroll action during the rotation of the content determines a depth of a perspective view along a z-axis; and
in response to reaching an end of the content, adjusting the tilt angle of the content in proportion to the one of the speed and acceleration of the scroll action.

2. The method of claim 1, further comprising:
retrieving a sample frequency for measurements of the direction based on at least one of: a predetermined system setting and a user adjustable value; and
determining the direction based on an average of sampled measurements of the direction of the scroll action measured based on the sample frequency.

3. The method of claim 1, further comprising:
retrieving a sample frequency for measurements of the speed based on at least one of: a predetermined system setting and a user adjustable value; and
determining the speed based on an average of sampled measurements of the speed of the scroll action measured based on the sample frequency.

4. The method of claim 1, further comprising:
interpreting the scroll action to move in the direction on one of: an x-axis and a y-axis in response to detecting the direction having the tilt angle other than about 0 degrees, about 90 degrees, about 180 degrees, and about 270 degrees.

5. The method of claim 4, further comprising:
selecting the x-axis as the rotation axis in response to the direction being less than a 45 degree tilt angle from the y-axis.

6. The method of claim 4, further comprising:
selecting the y-axis as the rotation axis in response to the direction being less than a 45 degree tilt angle from the x-axis.

7. The method of claim 4, further comprising:
selecting one of: the x-axis and the y-axis as the rotation axis in response to the direction being at a 45 degree tilt angle from one of: the x-axis and the y-axis based on at least one of: a predetermined system setting and a user preference.

8. The method of claim 1, further comprising:
selecting an x-axis as the rotation axis in response to determining the direction having the tilt angle including one of: about 0 degrees and about 180 degrees; and
selecting a y-axis as the rotation axis in response to determining the direction having the tilt angle including one of: about 90 degrees and about 270 degrees.

9. The method of claim 1, further comprising:
determining a rotation point at an edge of a display surface of the computing device opposite another edge on a path of the direction of the scroll action.

10. The method of claim 1, further comprising:
determining a rotation point based on one of:
- a content entry location on to a display surface of the computing device, and
- at least one of: a predetermined system setting and a user configurable setting at a location on the display surface of the computing device.

11. A computing device for providing a rotation of a content during a scroll action, the computing device comprising:
a memory configured to store instructions; and
a processor coupled to the memory, the processor executing a display application in conjunction with the instructions stored in the memory, wherein the display application is configured to:
display the content;
detect the scroll action from a captured gesture interacting with the content;
retrieve a first sample frequency for measurements of a direction and a second sample frequency for measurements of a speed based on at least one of: predetermined system settings and user adjustable values;
determine the direction based on an average of sampled measurements of the direction of the scroll action measured based on the first sample frequency;
determine the speed based on an average of sampled measurements of the speed measurements of the scroll action measured based on the second sample frequency;
move the content based on the speed in the direction of the scroll action;
determine a rotation point at an edge of a display surface of the computing device, opposite another edge, on a path of the direction of the scroll action;
rotate the content on the rotation point and on a rotation axis perpendicular to the direction based on a tilt angle in proportion to the speed of the scroll action, wherein the proportion between the tilt angle and the speed of the scroll action during the rotation of the content determines a depth of a perspective view along a z-axis; and
in response to reaching an end of the content, adjust the tilt angle of the content in proportion to the speed of the scroll action.

12. The computing device of claim 11, wherein the application is further configured to:
display additional content in the perspective view along the z-axis in proportion to the tilt angle while rotating the content.

13. The computing device of claim 12, wherein the application is further configured to:
determine the proportion based on at least one of: another predetermined system setting and a user configurable setting.

14. The computing device of claim 13, wherein the application is further configured to:
increase additional content in the perspective view in response to an increase in at least one of: the speed and the proportion; and
decrease the additional content in the perspective view in response to a decrease in at least one of: the speed and the proportion.

15. The computing device of claim 11, wherein the application is further configured to:
gradually adjust the tilt angle to about 0 degrees in response to at least one of: not detecting another scroll action and reaching the end of the content.

16. The computing device of claim 11, wherein the application is further configured to:
in response to reaching the end of the content and detecting another scroll action, rotate the content based on another rotation axis perpendicular to another direction of the other scroll action and another tilt angle in proportion to another speed of the other scroll action.

17. A method executed on a computing device for providing a rotation of a content during a scroll action, the method comprising:
displaying the content;
detecting the scroll action from a captured gesture interacting with the content;
retrieving a first sample frequency for measurements of a direction and a second sample frequency for one of measurements of a speed and measurements of an acceleration based on at least one of: predetermined system settings and user adjustable values;
determining the direction based on an average of sampled measurements of the direction of the scroll action measured based on the first sample frequency;
determining one of the speed and the acceleration based on an average of one or more of sampled measurements of the speed and sampled measurements of the acceleration of the scroll action measured based on the second sample frequency;
moving the content based on the one of the speed and acceleration in the direction of the scroll action;
rotating the content on a rotation axis perpendicular to the direction based on a tilt angle in proportion to the one of the speed and acceleration of the scroll action, wherein the rotation axis is a two-dimensional projection of a scene onto a display surface, and wherein the proportion between the tilt angle and the speed of the scroll action during the rotation of the content determines a depth of a perspective view along a z-axis;
displaying additional content in the perspective view along the z-axis in proportion to the tilt angle while rotating the content; and
in response to reaching an end of the content and detecting another scroll action, rotating the content based on another rotation axis perpendicular to another direction of the other scroll action and another tilt angle in proportion to another one of the speed and acceleration of the other scroll action.

18. The method of claim 17, further comprising:
determining the rotation axis to be at a degree between an x-axis and a y-axis perpendicular to the direction of the scroll action.

19. The method of claim 18, further comprising:
providing a skewed perspective view of the content along the x-axis and the y-axis while rotating the content.

20. The method of claim 19, further comprising:
displaying additional content along the x-axis and the y-axis while rotating the content.

* * * * *